United States Patent
Barnett

(10) Patent No.: US 10,781,057 B2
(45) Date of Patent: Sep. 22, 2020

(54) SAFETY GRIP CONTROL FOR TELESCOPING SHEET LIFTERS

(71) Applicant: TRIODYNE SAFETY SYSTEMS, L.L.C., Glenview, IL (US)

(72) Inventor: Ralph Lipsey Barnett, Wilmette, IL (US)

(73) Assignee: TRIODYNE SAFETY SYSTEMS, L.L.C., Northbrook, IL (US)

( * ) Notice: Subject to any disclaimer, the term of this patent is extended or adjusted under 35 U.S.C. 154(b) by 135 days.

(21) Appl. No.: 16/036,435

(22) Filed: Jul. 16, 2018

(65) Prior Publication Data

US 2019/0016542 A1    Jan. 17, 2019

Related U.S. Application Data

(60) Provisional application No. 62/532,666, filed on Jul. 14, 2017.

(51) Int. Cl.
| | |
|---|---|
| *B65G 47/90* | (2006.01) |
| *B21D 43/24* | (2006.01) |
| *B65G 49/06* | (2006.01) |
| *B66C 1/44* | (2006.01) |
| *B66C 1/30* | (2006.01) |

(52) U.S. Cl.
CPC .......... *B65G 47/905* (2013.01); *B21D 43/24* (2013.01); *B65G 47/902* (2013.01); *B65G 49/061* (2013.01); *B66C 1/30* (2013.01); *B66C 1/445* (2013.01); *B65G 49/068* (2013.01)

(58) Field of Classification Search
CPC .. B65G 47/905; B65G 49/061; B65G 47/902; B21D 43/24

USPC ........ 294/67.1, 66.1, 81.5, 119.1; 271/10.14, 271/128; 414/664

See application file for complete search history.

(56) References Cited

U.S. PATENT DOCUMENTS

| | | | | |
|---|---|---|---|---|
| 1,395,232 A | * | 10/1921 | Kronquest | B21D 43/24 271/165 |
| 2,847,212 A | * | 8/1958 | Stem | B65H 3/46 271/18.1 |
| 2,917,205 A | * | 12/1959 | Matasic | B21D 43/24 221/210 |
| 3,251,593 A | * | 5/1966 | Ried | B21D 43/24 271/10.14 |
| 3,603,635 A | * | 9/1971 | Ide | B66C 1/10 294/67.1 |
| 3,861,732 A | * | 1/1975 | Piper | B66C 1/0281 294/65 |
| 3,945,674 A | * | 3/1976 | Ide | B66C 1/10 294/67.1 |

(Continued)

*Primary Examiner* — Paul T Chin
(74) *Attorney, Agent, or Firm* — Pauley Erickson & Swanson

(57) ABSTRACT

Systems for safety grip control of telescoping sheet lifters are provided. The systems incorporate at least one load interlock element and at least two alignment interlock elements joined to a carrying angle of the telescoping sheet lifter. The load interlock element detecting the presence of a load on the sheet lifter. The alignment interlock elements detecting the alignment of the load on the sheet lifter. The systems define three different load conditions: empty lifter, properly aligned sheets, and misaligned sheets. Corresponding or associated methods are also provided.

15 Claims, 4 Drawing Sheets

(56) References Cited

U.S. PATENT DOCUMENTS

| | | | | |
|---|---|---|---|---|
| 4,173,334 | A | * | 11/1979 | Lombard ................ B66F 9/122 294/67.1 |
| 5,024,575 | A | * | 6/1991 | Anderson .............. B65G 47/90 294/2 |
| 5,067,702 | A | * | 11/1991 | Muraishi ................. B65H 3/24 221/292 |
| 5,586,619 | A | | 12/1996 | Young |
| 6,845,976 | B2 | * | 1/2005 | Martin ................... B65G 59/04 271/145 |
| 8,870,253 | B2 | | 10/2014 | Mongan et al. |
| 2002/0096815 | A1 | | 7/2002 | Dachtler |
| 2019/0062073 | A1 | * | 2/2019 | Ferre ................... B65G 47/902 |

* cited by examiner

SAFETY GRIP CONTROL FOR TELESCOPING SHEET LIFTERS

CROSS REFERNCE TO RELATED APPLICATION

This application claims the benefit of U.S. Provisional Patent Application, Ser. No. 62/532,666, filed on 14 Jul. 2017. The Provisional Application is hereby incorporated by reference herein in its entirety and is made a part hereof, including but not limited to those portions which specifically appear hereinafter.

BACKGROUND OF THE INVENTION

Field of the Invention

This invention relates generally to load supporting lifters and, more particularly, to telescoping sheet lifters.

Description of Related Art

One type of load supporting lifter commonly utilized in or for the transportation and placement of materials in sheet form is the telescoping sheet lifter, An example of such a below-the-hook lifting device is illustrated in FIG. 1 and is generally identified by the reference numeral 10, The telescoping sheet lifter 10 includes a frame 12 with first and second pairs of upright spaced apart support legs 14, 16 and 20, 22 respectively. Each of the pairs of support legs support a corresponding parallel structural or carrying angle 24 and 26. The carrying angles 24 and 26 are parallel, telescopically spaced apart and oppositely disposed. Each of the carrying angles 24 and 26 include a horizontal load carrying leg 30, 32 and a perpendicular contact wall 34, 36. As will be appreciated, the frame may suitably form, include or contain a bridge 40, a hoist 42 and/or a trolley (not shown) such as known in the art.

In operation, the horizontal load carrying legs 30, 32 of the two parallel structural carrying angles 24, 26 are inserted underneath parallel edges of a bottom sheet in a stack of sheets. The integrity of the sheet lifter derives from the sheets desirably remaining horizontal. Under this constraint, the parallel legs of the carrying angles provide an interference ledge that desirably preclude an escape geometry that will unintentionally release the sheets.

Clearly, the telescoping nature of the lift is critical in reducing the escape corridor by closing the distance between the carrying angles.

While the effectiveness of a sheet lifter is easy to visualize when the stacked sheets are in alignment, misalignment of the horizontal sheets can introduce a variety of undesired consequences including damage to sheets being processed as well as possible damage to operators and those in the vicinity of the lifter. For example, fanning out the sheets prevents full closure of the carrying angles which reduces the support footprint. Further, a false latching may occur when very compact sheets are even slightly rotated.

In view of these and other problems, complications and possible shortcomings of current telescoping sheet lifters, there is a need and a demand for telescoping sheet lifters with improved safety grip control.

SUMMARY OF THE INVENTION

A general object of the invention is to provide improved safety grip control for telescoping sheet lifters A more specific objective of the invention is to overcome one or more of the problems described above.

One aspect of the invention relates to a new system for safety grip control of a telescoping sheet lifter. The telescoping sheet lifter includes first and second parallel, telescopically spaced apart and oppositely disposed carrying angles. The first and second carrying angles each include a horizontal load carrying leg and a perpendicular contact wall.

In accordance with one embodiment, a new system for safety grip control of a telescoping sheet lifter includes a load interlock element joined to the first carrying angle. The load interlock element includes a plunger and a perpendicularly disposed load interlock element contact wall at opposites end thereof. The plunger is disposed in a load carrying region of the first carrying angle. In operation, the plunger is depressed by a load carried by the load carrying leg and results in the load interlock element contact wall contacting one or more control elements disposed on the carrying angle perpendicular contact wall.

The system further includes a first alignment interlock element joined to one of the first and second carrying angles and a second alignment interlock element also joined to one of the first and the second carrying angles. Each of the alignment interlock elements include a core rod disposed through the respective carrying angle perpendicular contact wall in contact communication with a load on the respective load carrying leg. Each of the alignment interlock elements further include a solenoid disposed about the core rod, a first and a second end stop also disposed about the core rod and bracketing the solenoid with the first end stop spaced apart from the solenoid by a spring element and the second end stop adjacent the perpendicular contact wall, an actuator bracket also disposed about the core rod and disposed between the solenoid and the second end stop. The actuator bracket is disposed upon actuation for contacting an alignment limit switch disposed on the respective carrying angle perpendicular contact wall. The solenoids are in actuation communication with the respective alignment limit switch with the solenoids being activated when the respective alignment limit switch is activated to urge the respective core rod through the respective carrying angle perpendicular contact wall to ensure that the load on the carrying leg is appropriately spaced away from the carrying angle perpendicular contact wall.

In another aspect of the invention, a method for safety grip control of a telescoping sheet lifter is provided. In accordance with one embodiment, such a method involves detecting a load on the lifter via a load interlock element joined to a first carrying angle of the telescoping sheet lifter. The load interlock element includes a plunger and a perpendicularly disposed contact wall at opposite ends thereof. The plunger is disposed in a load carrying region of the first carrying angle with the plunger being depressed by a load carried by the load carrying leg and resulting in the contact wall contacting one or more control elements disposed on the perpendicular contact wall. The method further involves detecting alignment of the load via a first alignment interlock element joined to one of the first and second carrying angles and a second alignment interlock element joined to one of the first and second carrying angles. Each of the alignment interlock elements include a core rod disposed through the respective carrying angle perpendicular contact wall in contact communication with a load on the respective load carrying leg. Each of the alignment interlock elements further include a solenoid disposed about the core rod, a first and a second end stop also disposed about the core rod and bracketing the solenoid with the first end stop spaced apart from the solenoid by a spring element and the second end stop adjacent the perpendicular contact wall, an actuator bracket also disposed about the core rod and disposed between the solenoid and the second end stop, the actuator bracket is disposed upon actuation for contacting an alignment limit switch disposed on the respective carrying angle perpendicular contact wall. Each of the respective solenoids are in actuation communication with the respective alignment limit switch with the solenoids being activated when the respective alignment limit switch is activated to urge the respective core rod through the respective carrying angle perpendicular contact wall to ensure that the load on the carrying leg is appropriately spaced away from the carrying angle perpendicular contact wall.

Other objects and advantages will be apparent to those skilled in the art from the following detailed description taken in conjunction with the appended claims and drawings.

DETAILED DESCRIPTION

The present invention provides improved safety grip control for a telescoping sheet lifter.

Figure 1:
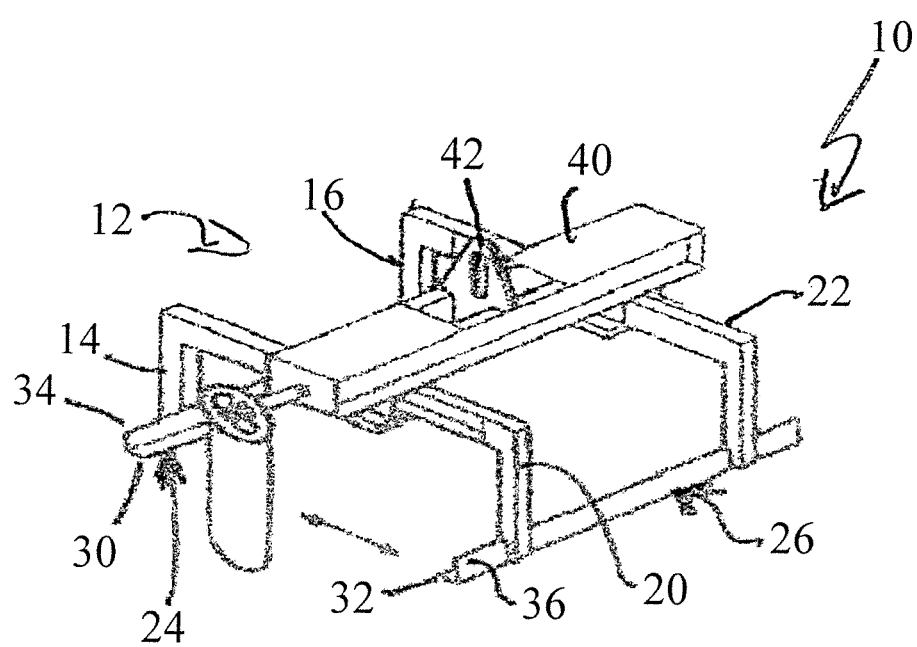
FIG. 1 perspective view of telescoping sheet lifter such as known in the art.
Figure 2:
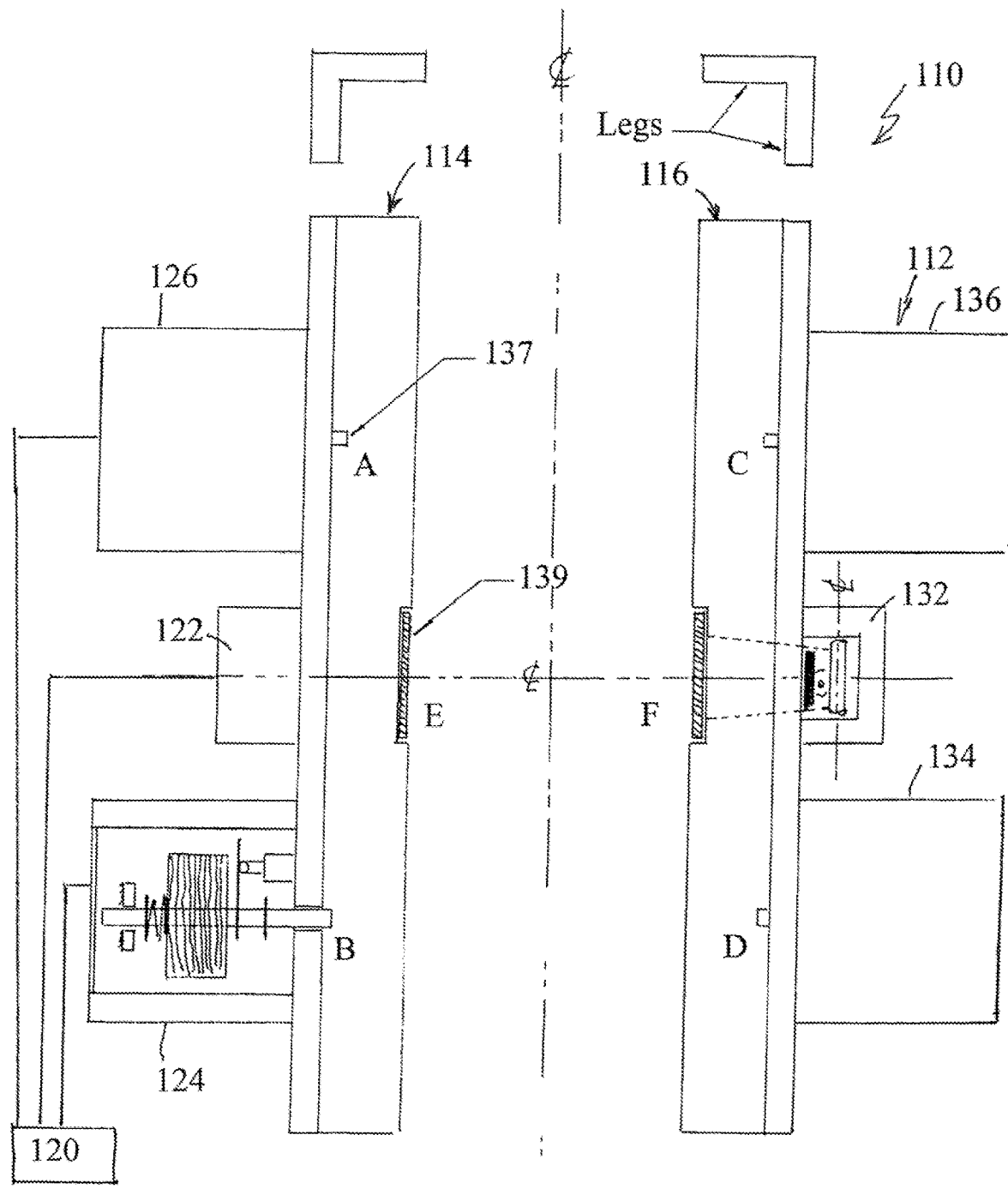
FIG. 2 is a plan view schematic of the carrying angles of a telescoping sheet lifter in accordance with one embodiment of the invention, showing the carrying angles in isolation.

With reference now to FIGS. 2-7, there is shown in FIG. 2, a portion of a telescoping sheet lifter 110 incorporating a system 112 for safety grip control of the lifter in accordance with one embodiment of the invention. More specifically, FIG. 2 shows structural or carrying angles 114 and 116 of the telescoping sheet lifter 110 incorporating the safety grip control system 112.

FIG. 2 shows the carrying angles 114 and 116 in isolation from the other portions of the sheet lifter. As will be appreciated, certain standard elements not necessary for an understanding of the invention may have been omitted or removed from the figures for purposes of facilitating illustration and comprehension.

Loaded telescoping sheet lifters must maintain symmetry (see the center lines depicted in FIG. 2). Safety requires that the sheets remain horizontal. This is accomplished by balance which in turn is provided by symmetry.

Moreover, if the bottom sheets are stable they will safely support an entire stack of sheets placed thereon. Hence, the subject invention is principally directed to and address stability and alignment of the bottom sheets of a stack being processed.

Control over a telescoping sheet lifter with motorized carrying angles requires a controller 120 that can appropriately signal the lifter 110 as well as included or associated components such as a crane controller such as for example including, among other things, forward, reverse and/or stop bridge; forward, reverse and/or stop trolley; upward, downward or stop hoist lift; and open, close or stop sheet lifter.

For example, when used in conjunction with an overhead crane, the controller desirably suitably and appropriately signals the motor relays to the trolley, bridge and hoist. The controller also desirably appropriately signals the motor relay in the below-the-hook device. In accordance with one preferred embodiment, the controller provides buttons, toggles, levers or the like to permit or allow the appropriate manipulation of the bridge, trolley, hoist and/or the sheet lifter.

In addition, the controller may and desirably will also serve to control auxiliary functions such as may for example include one or more of the following: E-Stop, Operation Frequency, Self Diagnostics, Horns, Lights, Special Brakes, On/Off Power Switch, etc.

To facilitate illustration, the controller 120 in FIG. 2 is only shown in connection with the load interlock and alignment elements (to be described and discussed further below) associated with the carrying angle 114 as will be appreciated and understood, in practice the controller may similarly or alternatively be in connection with load interlock and alignment elements associated with the carrying angle 116.

To minimize the probability of accidental release of elevated sheet stacks, the controller system logic may prevent lifter release (open) when other directional controls are active. Dual switches may be used to reduce accidental control activation; e.g., a second Push-To-Operate (PTO) button that must act concurrently with the directional controls. Controls may incorporate a dual movement capability such as detented levers and Lift-To-Operate (LTO) toggle switches. Barrier guards, such as known in the art, may be appropriately incorporated and utilized to limit the approach corridors to control elements such as push buttons, toggles, levers, and joy sticks, for example. Finally, the colors, shapes, and tactile feedback of the controls can be changed or adjusted as is known in the art to prevent mix-ups or other unintended actions.

The carrying angle 114 includes, contains or at least in part houses an embedded load interlock element 122 and alignment elements 124 and 126. Similarly, the carrying angle 116 includes, contains or at least in part houses an embedded load interlock alignment element 132 and alignment elements 134 and 136. The load interlock elements 122 and 132 and the embedded alignment elements 124, 126, 134, and 136 are desirably operationally and/or functionally connected, joined or in communication with a controller 120. As described and discussed more fully below, the embedded load interlock elements 122 and 132 and the alignment elements 124, 126, 134, and 136 define three different load conditions: empty lifter, properly aligned sheets, and misaligned sheets.

The telescoping sheet lifter 110 and/or the system 112 incorporate or include plunger or the like devices or elements 137 and 139, for example, and such as described in greater detail below.

Figure 3:
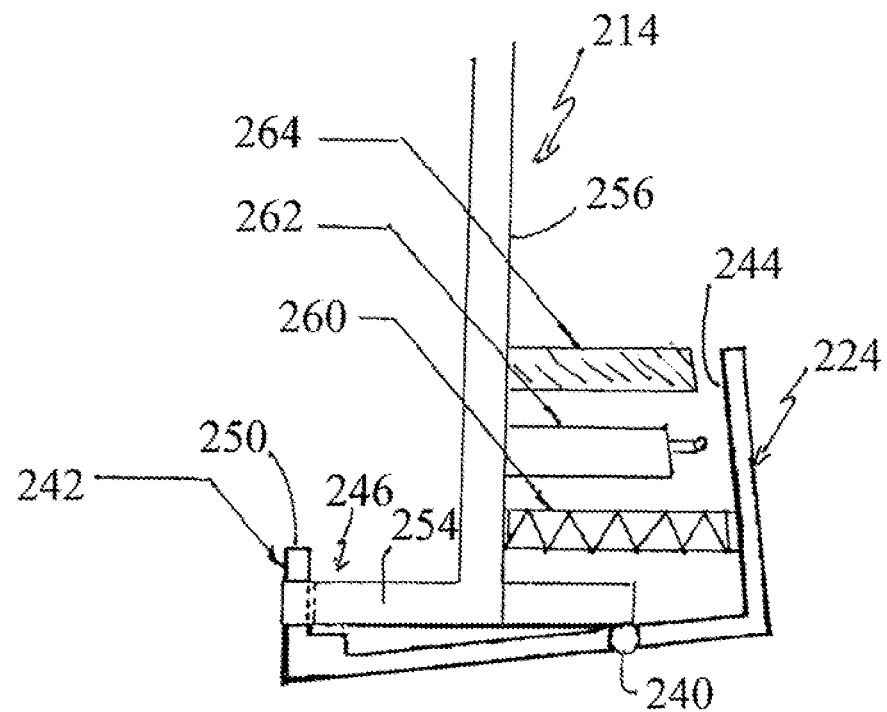
FIG. 3 is a side view schematic of a carrying angle with a load interlock element in accordance with one embodiment of the invention in an unloaded state.

FIG. 3 illustrates a carrying angle 214 with a load interlock element 224 in accordance with one embodiment of the invention in a static at rest state when the carrying angle is free of a load, e.g., in an unloaded state. As shown, the load interlock element 224 is suitably joined or connected with or to the carrying angle 214 such as via a pivotal connection 240. The load interlock element 224 includes a plunger 242 and a perpendicularly disposed load interlock element contact wall 244 at opposites end thereof. The plunger 242 is placed or positioned in a load carrying region 246 of the carrying angle 214. As shown, in the unloaded state or condition, the plunger 242 includes an end or distal portion 250 such as extends or protrudes through the load carrying region 246 of the carrying angle 214, e.g., through the horizontal load carrying leg 254 of the carrying angle 214. The perpendicular contact wall 256 of the carrying angle 214 includes, contains or has placed thereon control elements such as a spring 260, a load limit switch 262 and a stop 264. The spring 260 can desirable serve to maintain the load interlock element 224 in a static, at rest state, when the carrying angle 214 is free of a load. The stop 264 can desirable serve to limit the extent to which the load interlock element 224 can pivot when subjected to a load. The load limit switch 262 can desirably signal or activate when properly or appropriately actuated. With the load interlock element 224 depicted or shown in FIG. 3 representing an unloaded sheet lifter with a normally closed load limit switch 262 that preserves the full functions of the sheet lifter and included or associated components such as a crane controller including, among other things, forward and reverse bridge, forward and reverse trolley, up and down lift, and open and closed sheet lifter.

Figure 4:
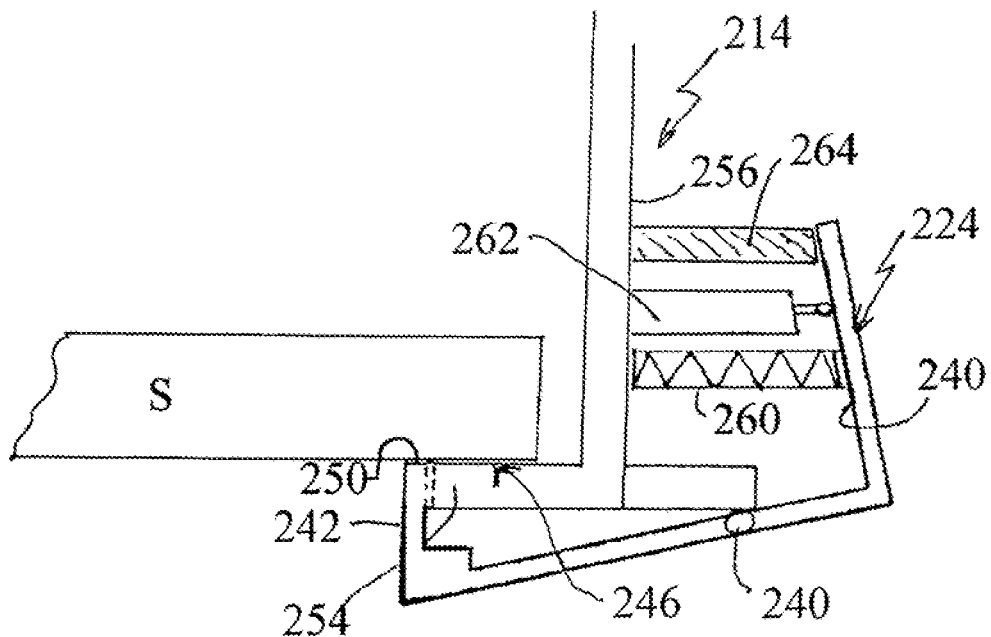
FIG. 4 is a side view schematic of the carrying angle with the load interlock element shown in FIG. 3 but now in a loaded state.

FIG. 4 illustrates the carrying angle 214 with the load interlock element 224 but now in a loaded state such as when the load (e.g., sheets) are lifted off of cribbing. More specifically, the carrying angle. 214 is now loaded with a sheet S placed or positioned in or on the load carrying region 246 of the carrying angle 214. In this loaded state, the plunger 242 is depressed by the load (S) carried by carrying angle 214 such that the plunger 242, particularly the end of the plunger distal portion 250, is desirably flush with the load adjacent surface of the carrying angle 214 and resulting in the load interlock element contact wall 244 contacting the load limit switch 262 control element disposed on the carrying angle perpendicular contact wall 256.

Figure 5:
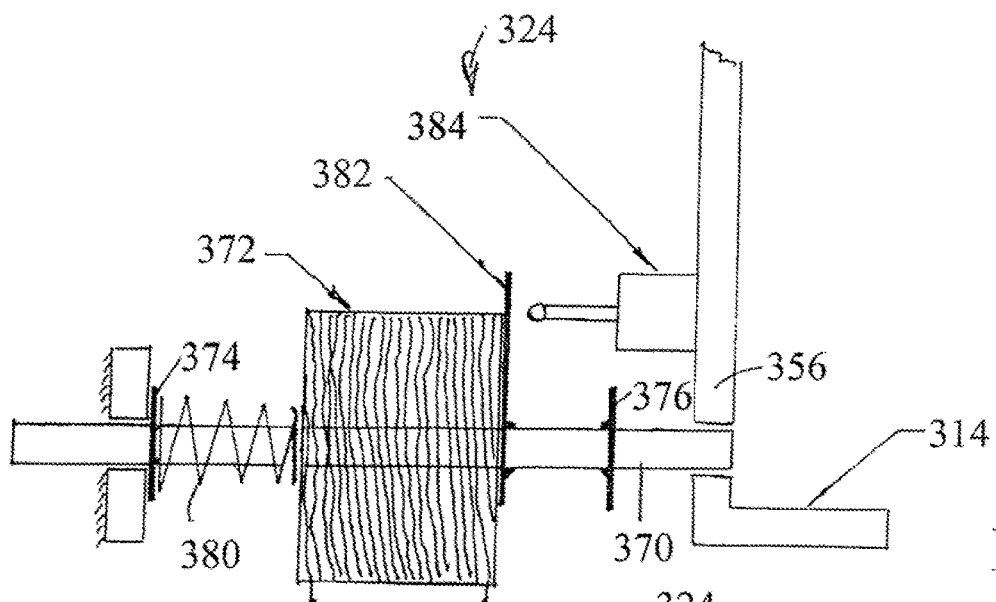
FIG. 5 is a side view schematic of a carrying angle with alignment interlock element in accordance with one embodiment of the invention in an unloaded state.

FIG. 5 illustrates a carrying angle 314 with an alignment interlock element 324 in accordance with one embodiment of the invention in a static at rest state when the carrying angle 314 is free of a load, e.g., in an unloaded state. The alignment interlock element 324 includes a core rod 370 disposed through the respective carrying angle perpendicular contact wall 356. The alignment interlock element 324 includes a solenoid 372 disposed about the core rod 370, a first and a second end stop 374 and 376, respectively, also disposed about the core rod 370 and bracketing the solenoid 372 with the first end stop 374 spaced apart from the solenoid 372 by a spring element 380 and the second end stop 376 adjacent the perpendicular contact wall 356. An actuator bracket 382 is also disposed about the core rod 370 and disposed between the solenoid 372 and the second end stop 376. The actuator bracket 382 is disposed upon actuation for contacting an alignment limit switch 384 disposed on the carrying angle perpendicular contact wall 356. As will be appreciated, when the carrying angle 314 is in such a static, at rest state, i.e., when the carrying angle 314 is free of a load, e.g., in an unloaded state, all functions of the subject lifter may desirably be active and the solenoid 372 is unenergized.

The solenoid 372 is in actuation communication with the load limit switch control element of an associated load interlock element such as described above, with the solenoid 372 being activated when the load interlock element control element is activated to urge the respective core rod 370 through the respective carrying angle perpendicular contact wall 356 to ensure that the load on the carrying leg 314 is appropriately spaced away from the carrying angle perpendicular contact wall 356.

Figure 6:
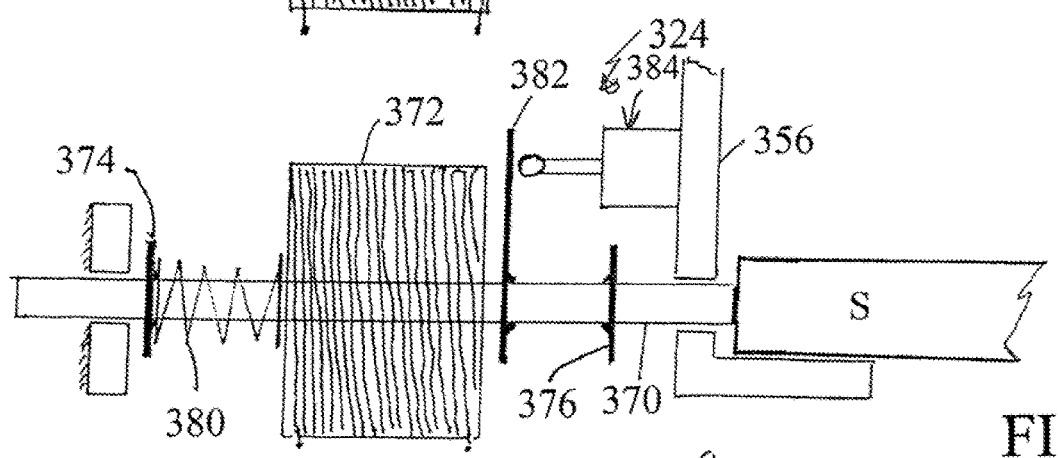
FIG. 6 is a side view schematic of the carrying angle with alignment interlock element shown in FIG. 5 but now in a loaded state and with the load spaced from the carrying angle perpendicular side wall by a maximum allowed distance or gap.

FIG. 6 illustrates the carrying angle 314 with the alignment interlock element 324 shown in FIG. 5 but now in a loaded state (loaded with sheet S) and with the load spaced from the carrying angle perpendicular side wall 356 by a maximum desired allowed distance or gap. When the carrying angle 314 is in such a loaded state, all functions of the subject lifter may desirably be active except for the "open" function and the solenoid 372 is energized.

Figure 7:
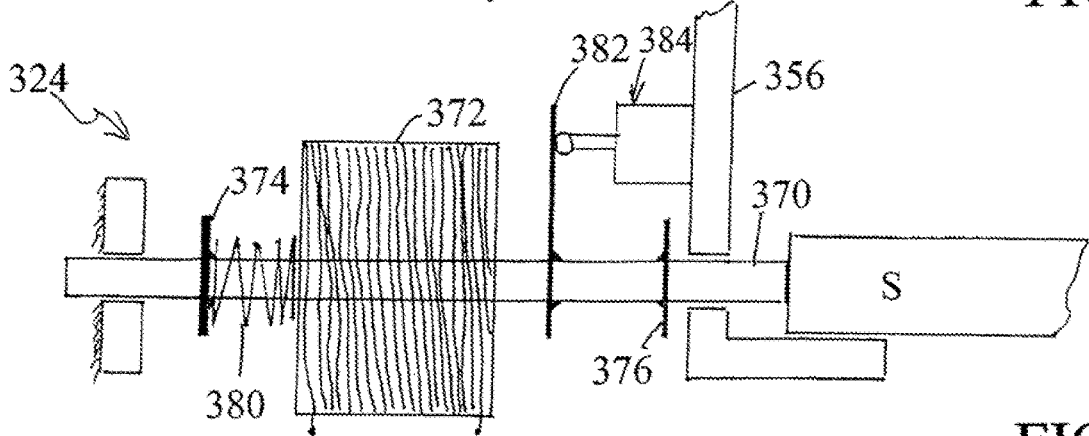
FIG. 7 is a side view schematic of the carrying angle with alignment interlock element shown in FIG. 5 but now in a loaded state and with the load spaced from the carrying angle perpendicular side wall by a distance or gap that is excessive or greater than desired.

FIG. 7 illustrates the carrying angle 314 with the alignment interlock element 324 shown in FIG. 5 but now in a loaded state (loaded with sheet S) and with the load spaced from the carrying angle perpendicular side wall 356 by a distance or gap that is excessive or greater than desired. When the carrying angle 314 is in such a loaded state, all functions of the subject lifter may desirably be active except for the "close" and "lower" functions and the solenoid 372 is energized.

The load interlock element depicted in FIG. 3 represents an unloaded sheet lifter with a normally closed load limit switch that preserves the full functions of the original crane controller which includes, among other things, forward and reverse bridge, forward and reverse trolley, up and down lift, and open and closed sheet lifter. When sheets are lifted off of cribbing, FIG. 4 shows a depressed heavy duty plunger on the carrying angle and a depressed load limit switch. When the load limit switch is held closed by the sheets it activates the solenoid shown in FIGS. 6 and 7. The solenoid, which is part of the alignment interlock element, urges the associated core rod to the right creating a gap between the bottom sheets and the core rod. If the gap is too large, FIG. 7, the alignment limit switch plunger is depressed and a relay precludes any controller commands accept close (lifter) and lower load (hoist down). A large gap reflects an unstable sheet configuration where the directional commands close and down are the only safe operations.

If the solenoid core rod contacts the lower sheets close to the vertical leg of the carrying angle, the gap is small (perhaps zero) and the alignment limit switch plunger is not depressed [see FIG. 6]. A relay associated with this small gap allows all of the directional functions of the crane controller except open which could theoretically destabilize the sheet load. A small gap means a stable loading that may be maneuvered safely.

In addition, the following features may be desirably included, incorporated or practiced in or with a system in accordance with the subject development:

1. When the carrying angles are being loaded, the solenoid core rods are retracted out of harm's way.
2. The auxiliary function output relays (horn, lights, brakes, etc.) are always active.
3. While the ASME standard for telescoping sheet lifters does not discuss the desirability of nestling the sheets against the vertical legs of the carrying angles, anecdotal evidence suggests that operators try to fully engage the sheets with the carrying angles.
4. Limit switches and solenoids can be obtained with very high reliability.
5. The load interlock is very sensitive and can be equally effective in conjunction with loads in a wide range of weights, e.g., the load interlock can be equally effective in detecting a 20 lb or a 50,000 lb sheet stack.
6. When the load interlock or interlocks are first depressed, all crane functions can desirably be blocked for a set interval of time (e.g., such as for about 4 seconds, or more or less as may be desired in particular applications, such as through the use of a standard timer relay or the like device).
7. During such a set interval, the sensors desirably can serve to distinguish bet ween proper alignment and misalignment.
   a. Appropriate sensing of proper alignment can desirably act or serve to restore all crane functions except open after the timer relay has appropriately "timed out."
   b. Appropriate sensing of misalignment can desirably act or serve to limit restoration, after the timer relay has appropriately "timed out," to or of only the close or lower functions.

The above described system for safety grip control of a telescoping sheet lifter incorporates or includes a load interlock element centrally located in each of the opposed carry angles. The system further incorporates or includes two alignment interlock elements in each of the opposed carry angles. The alignment interlock elements are preferably spaced apart along the respective carrying angles.

In accordance with one preferred embodiment wherein a robust safety system is desired or required, the system, sometimes termed "automatic safety control", can require simultaneous satisfaction (small gap) of all four alignment interlocks. The interlocks should be wired in series with the solenoid. On the other hand, a load interlock is only required on one carrying angle. The second load interlock element provides safety redundancy. That is, if a solitary load interlock were to fail to activate the solenoid during loading or operation, it would no longer act as a sentinel against unsafe sheet alignment. Desirably, the two load interlocks are wired in parallel; either one or both should signal the solenoid.

In an alternative embodiment, sometimes termed "compact safety control, with respect to the alignment interlock, only two centrally located sensors are necessary for alignment protection if a "zero gap" criterion is imposed. If the bottom sheets of the load are flush against the center of the vertical legs of the carrying angles, a safe loading scenario will be achieved.

The "compact safety control" design uses half the sensors of the "automatic safety control" design while maintaining the same general operating profile. The reliability, robustness, and ease of loading properties of the "compact safety control" design may, however, be slightly compromised as compared to the above-described automatic safety control system.

As will be appreciated, safety control systems in accordance with the invention may desirably incorporate or include various varieties of robust limit switches, such as known in the art, embedded in the upright legs of the carrying angles such as at locations A, B, C, and D or at locations E and F shown in FIG. 2. When fully depressed (i.e., flush with the leg surface), these limit switches can appropriately signal or identify that a flush contact has been achieved between the bottom sheets of a load and the inside walls of the carrying angles. For example, in one embodiment, a vertical shining light can be illuminated such as to inform the crane operator and/or bystanders that a flush contact has been achieved between the bottom sheets and the inside walls of the carrying angles.

Systems may provide that any light that it not illuminated indicates a possible compromised alignment of the sheets. Systems with either two lights or four lights can be very economical and easily retrofittable with existing telescopic sheet lifters.

In another embodiment, sometimes termed "subcompact safety control," two robust limit switches are embedded in the upright legs of the opposed carrying angles, e.g., at locations E & F in FIG. 2. The concurrent flush closure by the bottom elements in a sheet stack load provides evidence that the stack may be safely maneuvered if the open capability is blocked. When used with a two light system, a low voltage limit switch signal can cause a relay to a signal or signals, such as for lights to be illuminated and/or a horn to engage, and the lift open capability to be curtailed. All other functions of the controller will be unaffected.

Whereas such an embodiment will greatly aid operators and bystanders by certifying the safety of properly loaded sheets, it will not automatically prevent the handling of misaligned sheet stacks. Indeed, misaligned sheets are maneuvered the same way as in an original telescoping sheet lifter.

From the above, it will be appreciated that the broader practice of the invention provides improved safety grip control for telescoping sheet lifters and, more particularly, the invention prevents the accidental discharge of misaligned and mismatched rectangular sheets from a telescoping sheet lifter. As will be appreciated, sensors are used to establish the location and orientation of the bottom sheet in a load stack. In accordance with one preferred embodiment, the lifting of dangerous load stack placement geometries is avoided or prevented with the subject control logic.

The claims are not intended to include, and should not be interpreted to include, means-plus- or step-plus-function limitations, unless such a limitation is explicitly recited in a given claim using the phrase(s) "means for" or "step for," respectively.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. A system for safety grip control of a telescoping sheet lifter, the telescoping sheet lifter including first and second parallel, telescopically spaced apart and oppositely disposed carrying angles, the first and second carrying angles each including a horizontal load carrying leg and a perpendicular contact wall, the system comprising:
   a first load interlock element joined to the first carrying angle, the first load interlock element including a first plunger and a perpendicularly disposed first load interlock element contact wall at opposites end thereof, with the first plunger disposed in a load carrying region of the first carrying angle, the first plunger being depressed by a load carried by the first load carrying leg and resulting in the first load interlock element contact wall contacting one or more control elements disposed on the first carrying angle perpendicular contact wall and a first alignment interlock element joined to one of the first and second carrying angles and a second alignment interlock element joined to one of the first and the second carrying angles, each of the alignment interlock elements including a core rod disposed through the respective carrying angle perpendicular contact wall in contact communication with a load on the respective load carrying leg, each of the alignment interlock elements including a solenoid disposed about the core rod, a first and a second end stop also disposed about the core rod and bracketing the solenoid with the first end stop spaced apart from the solenoid by a spring element and the second end stop adjacent the perpendicular contact wall, an actuator bracket also disposed about the core rod and disposed between the solenoid and the second end stop, the actuator bracket is disposed upon actuation for contacting an alignment limit switch disposed on the respective carrying angle perpendicular contact wall, each of the solenoids in actuation communication with the alignment limit switch with the solenoids being activated when the alignment limit switch is activated to urge the respective core rod through the respective carrying angle perpendicular contact wall to ensure that the load on the carrying leg is appropriately spaced away from the carrying angle perpendicular contact wall.

2. The system of claim 1 wherein the first load interlock element and the first and second alignment interlock elements define three different load conditions: empty lifter, lifter with a properly aligned sheets and lift with misaligned sheets.

3. The system of claim 1 wherein the one or more control elements disposed on the first carrying angle perpendicular contact wall comprise a load limit switch.

4. The system of claim 3 wherein the one or more control elements disposed on the first carrying angle perpendicular contact wall additionally comprise a stop, a spring or both.

5. The system of claim 1 wherein the first load interlock element is pivotally joined to the first carrying angle of the telescoping sheet lifter.

6. The system of claim 1 additionally comprising a controller in signal receiving communication with the first load interlock element and the first and second alignment interlock elements, the controller identifying at least three different load conditions: empty lifter, lifter with a properly aligned sheets and lifter with misaligned sheets.

7. The system of claim 6 wherein a crane is in operational communication with the telescoping sheet lifter and the first and second carrying angles are each motorized, wherein the controller is signal transmitting communication with both the crane and the telescoping sheet lifter.

8. The system of claim 1 wherein full depression of the first plunger activates a signal to an operator that flush contact has been achieved between a bottom sheet and the first carrying angle.

9. The system of claim 1 wherein each of the first and second carrying angles of the telescoping sheet lifter include a pair of spaced apart alignment interlock elements.

10. The system of claim 1 additionally comprising:

a second load interlock element joined to the second carrying angle, the second load interlock element including a second plunger and a perpendicularly disposed second load interlock element contact wall at opposites end thereof, with the second plunger disposed in a load carrying region of the second carrying angle, the second plunger being depressed by a load carried by the second load carrying leg and resulting in the second load interlock element contact wall contacting one or more control elements disposed on the second carrying angle perpendicular contact wall.

11. A method for safety grip control of a telescoping sheet lifter, the telescoping sheet lifter including first and second parallel, telescopically spaced apart and oppositely disposed carrying angles, the first and second carrying angles each including a horizontal load carrying leg and a perpendicular contact wall, the method comprising:

detecting a load on the lifter via a first load interlock element joined to the first carrying angle, the first load interlock element including a first plunger and a first perpendicularly disposed contact wall at opposite ends thereof, with the first plunger disposed in a load carrying region of the first carrying angle, the first plunger being depressed by a load carried by the load carrying leg and resulting in the contact wall contacting one or more control elements disposed on the first perpendicular contact wall and detecting alignment of the load via a first alignment interlock element joined to one of the first and second carrying angles and a second alignment interlock element joined to one of the first and second carrying angles, each of the alignment interlock elements including a core rod disposed through the respective carrying angle perpendicular contact wall in contact communication with a load on the respective load carrying leg, each of the alignment interlock elements including a solenoid disposed about the core rod, a first and a second end stop also disposed about the core rod and bracketing the solenoid with the first end stop spaced apart from the solenoid by a spring element and the second end stop adjacent the perpendicular contact wall, an actuator bracket also disposed about the core rod and disposed between the solenoid and the second end stop, the actuator bracket is disposed upon actuation for contacting an alignment limit switch disposed on the respective carrying angle perpendicular contact wall, the solenoids in actuation communication with the alignment limit switch with the solenoids being activated when the alignment limit switch is activated to urge the respective core rod through the respective carrying angle perpendicular contact wall to ensure that the load on the carrying leg is appropriately spaced away from the carrying angle perpendicular contact wall.

12. The method of claim 11 wherein the first load interlock element and the first and second alignment interlock elements define three different load conditions: empty lifter, lifter with a properly aligned sheets and lift with misaligned sheets.

13. The method of claim 11 wherein full depression of the first plunger activates a signal to an operator that flush contact has been achieved between a bottom sheet and first carrying angle.

14. The method of claim 11 wherein the control element comprises a load limit switch.

15. The method of claim 11 additionally comprising:

detecting a load on the lifter via a second load interlock element joined to the second carrying angle of the telescoping sheet lifter, the second load interlock element including a second plunger and a perpendicularly disposed second load interlock element contact wall at opposites end thereof, with the second plunger disposed in a load carrying region of the second carrying angle, the second plunger being depressed by a load carried by the second load carrying leg and resulting in the second load interlock element contact wall contacting one or more control elements disposed on the second carrying angle perpendicular contact wall.

\* \* \* \* \*